(12) United States Patent
Abdel-Khalik et al.

(10) Patent No.: US 12,367,408 B2
(45) Date of Patent: Jul. 22, 2025

(54) PHYSICS-GUIDED ANALYTICAL MODEL VALIDATION

(71) Applicant: UT-Battelle, LLC, Oak Ridge, TN (US)

(72) Inventors: Hany S. Abdel-Khalik, Oak Ridge, TN (US); Ugur Mertyurek, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 930 days.

(21) Appl. No.: 17/470,171

(22) Filed: Sep. 9, 2021

(65) Prior Publication Data

US 2022/0084704 A1 Mar. 17, 2022

Related U.S. Application Data

(60) Provisional application No. 63/076,962, filed on Sep. 11, 2020.

(51) Int. Cl.
*G06N 7/04* (2006.01)

(52) U.S. Cl.
CPC ..................... *G06N 7/04* (2013.01)

(58) Field of Classification Search
CPC ........................................................ G06N 7/04
See application file for complete search history.

(56) References Cited

U.S. PATENT DOCUMENTS

2010/0153086 A1* 6/2010 Satoh .................... G06F 30/367
703/14

OTHER PUBLICATIONS

D. Huang, H. Abdel-Khalik, "Modeling errors-preserving constrained sensitivity analysis", p. 1-12, 2020.*
Huang, D. et al., "Modeling errors-preserving constrained sensitivity analysis", Nuclear Engineering and Design, vol. 365, Aug. 15, 2020, pp. 110729-110740.

* cited by examiner

Primary Examiner — Kibrom K Gebresilassie
(74) Attorney, Agent, or Firm — Warner Norcross + Judd LLP

(57) ABSTRACT

This invention relates to a parameter or response assist filter that ensures that the predictions of a post-validation calibrated physics system simulator will remain within boundaries of a predetermined model validation domain. Embodiments utilize one or more filters to ensure calibrated model parameters $\hat{P}$ and/or calibrated responses $\hat{\phi}$ cause physics simulator model predictions to remain within the boundaries of the model validation domain MVD for a target application. The filters can be constructed prior to use or automatically inferred, or otherwise determined, from available measurements and other renditions of the physics system simulator during operation.

14 Claims, 11 Drawing Sheets

PHYSICS-GUIDED ANALYTICAL MODEL VALIDATION

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

The present invention relates to computer model validation.

Computer model validation generally refers to determining the degree to which a computer model is an accurate representation of the real world from the perspective of a target model application. Computer model validation is carried out in part by a comparison of model predictions arising from simulations to empirical evidence from experimental results.

Physics simulation systems for various types of models exist and are well known. In general, a physics system simulator can be configured to predict a response ($\Phi$) of essentially any system model using a series of mathematical equations that simulate the system behavior. A physics system simulator can be configured to simulate a range of different system conditions described by a system model (M).

Using input parameters (P) and the system model (M), the physics system simulator can simulate operation of the system and therefore simulate estimated system behavior, that is generate predictions of how a real system operated with those same model conditions would behave (i.e., how it would respond). The confidence, representing the overarching goal of model validation, in the predictions of the system responses ($\Phi$) can be quantified using an uncertainty estimator. An uncertainty estimator includes a parametric analysis module, which analyzes variations in the parameters ($\Delta P$) to quantify the corresponding variations in the responses ($\Delta \Phi$), denoted by a parametric uncertainty estimator module. Additionally, the uncertainty estimator leverages existing experimental results for systems that are similar to the target application to estimate the impact of modeling errors, denoted by a modeling errors estimator module. Modeling errors can originate from any approximations and simplifying assumptions inherent in the mathematical equations of the physics system simulator. In the extant model validation practices, the parametric uncertainty estimator and the modeling errors estimator are combined together using system-customized expert-guided scaling recipes to determine the overall confidence in the model predictions for the target application. Because it can be difficult to quantify the interactions between the parametric uncertainties estimated by a parametric uncertainty estimator module and the modeling errors estimated by a modeling error estimator module, model validation relies on system-customized expert-guided scaling recipes with conservative assumptions to model the interaction terms for the target application. This restricts the validation domain of the physics system simulator for the target application, and makes it difficult to accept any further changes to the physics system simulator once the validation is completed. Such post-validation changes are often sought for further improvement of the physics system simulator predictions, and/or to respond to possible changes in the modeling conditions from the time at which the validation was completed (e.g., the modeling conditions for a nuclear warhead change over long periods of time) making it difficult to ensure that the physics system simulator remains validated for the new conditions.

The confidence in model predictions for the target application could quickly degrade with any changes to the physics simulator system if introduced post its validation. Some of these changes are sought to improve the predictions of the physics system simulator or to respond to changes in the modeling conditions of a target application. These changes can be introduced in various ways, for example: (i) adjustment, i.e., calibration, of model parameters and/or model responses can be done to reduce the discrepancies between model predictions and real measurements for either the scaled-down experimental responses or any responses that may become available from new experiments becoming available post validation; (ii) changes to the mathematical equations used to describe the physics, often referred to as model improvements; and (iii) changes to the numerical solvers employed to solve the physics equations, to name a few. In our embodiment, these changes are referred to as post-validation calibration (PVC) to a physics system simulator, implying that these changes are introduced after the physics system simulator has already been validated for a given target application. In the remaining description, a PVC physics system simulator refers to a physics system simulator that has been calibrated in some way after its validation has been completed whereby the PVC predictions have not been properly vetted according to a process to ensure that they remain within the physics system simulator pre-determined validation domain.

Such PVC-type changes are not uncommon to introduce in an effort to improve the predictions of a physics system simulator, however, current model validation techniques do not have a suitable process to ensure the physics system simulator's predictions remain within its pre-determined validation domain. Depending on the use case, such PVC-type changes are either rejected by the regulatory body, used only for scoping studies, or a complete revalidation of the physics system simulator is repeated, or they are accepted without being questioned until real measurements from the target application can show they have violated the validation domain.

Referring to FIG. 1, a physics system simulator 110 typically employs various inputs including physics and ad-hoc parameters 102 (P), denoted collectively as model parameters, and variations describing their uncertainties 104 ($\Delta P$) along with various modeling approximations and assumptions 106, and the system model 112 (M) in order to simulate the behavior of the system as described by the system response $\Phi$ 108. Essentially the physics system simulator generates an estimated system response without actually operating the system—rather just simulating its operation with a computer.

Often times it is desirable to validate the predictions of a physics system simulator for the target application before actually building the target system in real life. If the system has an impact on real life, model validation may be mandated by government regulations. One technique for doing so is to reference a scaled-down version of the target system which can be built and can be experimented upon and can be modeled by the physics system simulator. Via use of standard validation techniques, a model validation domain is constructed, which represents the allowable conditions over which the physics system simulator can be used. Post-validation, it is not uncommon that the differences between the model predictions for the scaled-down system responses and the measured responses are unsatisfactory. In response, PVC-type changes are introduced in the physics system simulator until satisfactory predictions are produced. As noted earlier, PVC is used as an umbrella term to denote all calibrations to a physics system simulator post its validation. This may include adjustment of at least one model parameter and/or at least one response, an adjustment or a change to its numerical solver or its inherent mathematical equations, to name a few, all denoted on FIG. 2 as a calibration module 212. All or some of the changes introduced by a PVC process are mapped to the target application with the unsubstantiated premise that they are likely to improve the target application predictions since they improved the predictions for the scaled-down experiments for which real measurements exist. Currently the only legally-unchallenged approach to validate any PVC-type change is to repeat the validation process with the PVC-type changes included as part of a physics system simulator. This is however often not attempted given the lengthy and costly nature of validation.

Referring to FIG. 2, an exemplary block diagram representation of such a system 200 with an PVC-type calibration module 212 is shown configured for example to adjust parameter values used by the physics system simulator 214 and/or physics system simulator responses 210 to provide more accurate predictions (posteriori estimate) for the target application model M(A) 216. The physics system simulator 214 and calibration module 212 can accept the various inputs, including, for example assumptions 202, 204 as well as the experimental models 206 that represent the scaled-down experiments and their associated experimental measurements 208. The physics system simulator 214 and the calibration module 212 are collectively referred to as a PVC physics system simulator, implying that the calibration was not vetted against the MVD constructed using the original physics system simulator. The purpose of the invention is thus to ensure that the function of the calibration module does not violate the MVD boundaries.

In existing systems, a system model simulator 302 is utilized multiple times for multiple experiments M(E). Measured responses for experiments $\varphi_E$, reference, aka prior, values of the parameters P, and parameter variations $\Delta P$ are utilized throughout the process. The adjusted, i.e., calibrated, parameters P are used by a parameter calibration module 304 to estimate an adjusted application response prediction $\tilde{\phi}_A$ by the physics system simulator 302 for the application model M(A), aka as posteriori estimate. However, this type of PVC-type system lacks provisions to analyze impact on the PVC-type changes, for example, possible new interactions between the parametric uncertainty estimator module and the modeling errors estimator module as introduced by the PVC-type changes, and the associated impact on the MVD. Instead, this system essentially requires the user of the system to have pre-defined recipes based on expert judgement to adjust the model parameters for a particular target application model. Such recipes are meant to provide subjective confidence in the predictions of the physics system simulator based on many years of experience and familiarity with the system operation. These recipes however do not provide quantifiable confidence that the PVC physics system simulator will not violate the MVD boundaries.

A response PVC-type calibration module-based system 400 is depicted in FIG. 4. The physics system simulator 402 employs models for multiple experiments M(E), an application model M(A), measured responses for experiments $\varphi_E$, prior estimates of parameters P, and known variations $\Delta P$ in the parameters in order to produce responses for the calibration module 404, which in turn are used to adjust the parameters based on a comparison of the predicted responses and experimental measurements. However, these systems do not include any provisions to ensure calibrated parameters are applicable to other models, including the target application, i.e., do not impact the MVD of the physics system simulator.

Once a model and associated parameters are identified that generate a desired estimated response, one or more validation experiment models 508 can be utilized to validate the target application model and associated parameters. Referring to FIG. 5, validation 500 can be performed using a set of experiments ($E_v$) based on the target application. The selected set of experiments ($E_v$) are modeled with the physics system simulator 510 using the parameters 502 and parameter variations 504, and predictions of measured responses from the experiments (e.g., corresponding to the experiment measurements 506 are determined. The experiments are often completed at conditions different from the target application conditions. The predicted and measured responses for each experiment are compared to each other, and boundaries of a model validation domain (MVD) 514 for the physics system simulator and the associated parameters are calculated through an uncertainty estimator 512.

Current model validation techniques do not provide assurance that the PVC physics system simulator predictions remain within MVD boundaries of the physics system simulator for a target application. Physics system simulators are generally licensed for use in concert with their parameters, and modeling assumptions/approximations, for a predetermined range of application conditions referred to as a model validation domain (MVD).

In one PVC-type embodiment, given a plausible range of parameter variations, often related to their uncertainties, practitioners often attempt to adjust, i.e., calibrate, a model to improve its predictions, i.e., by reducing discrepancies between measured and predicted responses from scaled-down experiments via adjustment of its parameters without ensuring that the PVC physics system simulator predictions remain consistent with the MVD. However, any PVC-type calibration that relies on adjusting model parameter values runs the risk of changing the validity of the modeling assumptions/approximations by giving rise to additional sources of modeling errors, resulting in potential crossing of the MVD boundaries. Crossing the MVD boundaries means that the uncertainty estimator for model predictions could be under-estimating the true uncertainties.

SUMMARY OF THE INVENTION

The present invention is generally directed to a filter or set of filters to ensure that post-validation calibrated (PVC) physics system simulator predictions remain within boundaries of its predetermined model validation domain (MVD). The filter(s) can be predetermined without access to experimental measurements or can be generated based upon available measurements or other renditions of a physics system simulator.

One embodiment of the present disclosure is generally directed to a method for calibrating a physics system simulator configured to predict behavior and/or state of a physical system based on an application model and multiple model parameters and their corresponding known parameter variations. The application model is related to one or more experimental models and each experimental model is associated with a respective set of experimental measurements. The physics system simulator has a model validation domain (MVD) for a given target application with boundaries that can be described mathematically based on deterministic or stochastic multi-variate functions of the experimental-model responses, the corresponding sets of experimental measurements, derivatives thereof, the parameters and their variations, and an uncertainty estimator. The method can include predicting, by a first implementation of a physics system simulator, first experimental responses of the physical system by modeling the physical system using the experimental models based on the physical parameters and their corresponding parameter variations. The method includes filtering, by a validation assist parameter filter having an MVD boundary filter operator, the parameter variations corresponding to variations in responses for experimental models that cause the physics system simulator predictions for the target application responses to fall outside of the MVD. The method further includes updating the first experimental responses of the physical system by modeling the physical system using the experimental models based on the model parameters and their corresponding filtered parameter variations. The method includes calibrating or adjusting, with a parameter calibration module, the model parameters based on the updated first experimental responses, the corresponding sets of experimental measurements, and the filtered parameter variations. The method predicts, by the first implementation of the physics system simulator, a posteriori application response of the physical system by modeling the physical system using the application model based on the adjusted physical parameters.

The filtering can be defined by predicting, by a second implementation of the physics system simulator different from the first implementation of the physics system simulator, second experimental responses of the physical system by modeling the physical system using the experimental models based on the model parameters and their corresponding parameter variations. Constructing the filter can further include selecting, by a parameter-feature selector, parameter features comprising mathematical expressions derived from the multi-variate functions used to describe the boundaries of the model validation domain (MVD) and determining, by a validator of the filter module, whether the first experimental responses and the second experimental responses corresponding to the selected parameter features are within the boundaries of the model validation domain (MVD). In response to the parameter features falling outside the boundaries of the MVD the filter construction process can include removing, by a remover, the parameter features for which the first experimental responses and the second experimental responses are outside the boundaries of the model validation domain (MVD).

The first implementation of the physics system simulator can be a high-fidelity implementation of the physics system simulator, and the second implementation of the physics system simulator is a low-fidelity implementation of the physics system simulator. Further, selecting the parameter features can be performed using one or more of singular value decomposition, project pursuit techniques, or neural networks.

The filtering can be configured to be based upon an increase in mutual information beyond a threshold determined by comparison of scaled-down experimental responses and target application responses from two separate physics system simulator instances.

The present disclosure provides another embodiment of a method for filtering the responses of PVC physics system simulators. In this embodiment, the method includes predicting and filtering. The filtering includes filtering, by a validation assist response filter, the predicted experimental responses to remove variations thereof that cause the predicted experimental responses to fall outside the boundaries of the model validation domain (MVD). The method can also include determining, by a response calibration module, a posteriori application response of the physical system based on the application response, the parameter variations of the physical parameters, the filtered experimental responses and the corresponding sets of experimental measurements.

The method for calibrating a physics system simulator with a validation assist response filter can include constructing a validation assist response filter by selecting, by a response feature selector, response features including mathematical expressions derived from the multi-variate functions used to describe the boundaries of the model validation domain (MVD). The filter construction can further include determining, by a validator of the filter module, whether the selected response features are within the boundaries of the model validation domain (MVD) and in response to the selected response features falling outside the boundaries of the MVD, removing, by a remover, the response features that are outside the boundaries of the model validation domain (MVD). In some embodiments, selecting the response features can be performed using one or more of singular value decomposition, project pursuit techniques, or neural networks.

The filtering can be configured based upon an increase in mutual information beyond a threshold determined by comparison of a response from a pseudo target application model simulated by the physics system simulator, and a response from a pseudo set of scaled-down experimental models simulated by the same physics system simulator.

The methods for filtering the parameters and/or responses of PVC physics system simulators can be utilized in conjunction with a variety of different systems. For example, the methods can utilized in conjunction with a system for supporting separate-effect experiments for nuclear-power plants, a system for supporting integral-effect experiments for nuclear-power plants, a system for supporting small-scale mock-up experiments for nuclear-power plants, a system for validating first-of-a-kind reactor designs for nuclear-power plants, the system comprising, a system for validating advanced-fuel designs for nuclear power-plants, a system for supporting transportation of irradiated nuclear fuel for fuel-testing facilities, a system for evaluating burn-up credit for fuel-testing facilities, a system for destructively or non-destructively assessing of irradiated nuclear fuel inventory for fuel-testing facilities, or a system for detecting anomalies as part of condition monitoring of fuel-testing facilities, to name a few examples. The various systems can include one or more hardware processors and memory encoding instructions that, when performed by the hardware processors, cause the system to perform one or more of the aforementioned methods.

Another aspect of the present disclosure is directed to a method of constructing a validation assist parameter filter or a method of constructing a validation assist response filter.

The method of constructing a validation assist parameter filter can include comparing scaled-down experimental responses from two separate physics system simulator instances, obtaining an entropy-based filtration criterion using a statistical module that quantifies common information content between two sets of responses associated with the scaled-down experimental model and the target application model, as simulated by two different physics system simulators, selecting a plurality of parameter features with a parameter feature selector based upon the entropy-based filtration criterion, and configuring the validation assist parameter filter to filter the selected plurality of parameter features to ensure subsequent calibration with a calibration module does not generate parameter variations that violate the MVD boundaries.

The method of constructing a validation assist response filter can include obtaining a set of simulated experimental responses for each of a plurality of different scaled-down experimental models of the target application model, selecting one of the plurality of different scaled-down experimental models of the target application model as a pseudo target application model, selecting a subset of the plurality of different scaled-down experimental as a pseudo set of scaled-down experimental models, wherein the pseudo set of scaled-down experimental models excludes the pseudo target application model, calculating mutual information between at least one response from the pseudo target application model simulated by the physics system simulator, and at least one response from the pseudo set of scaled-down experimental models simulated by the same physics system simulator, determining the calculated mutual information exceeds a pre-determined threshold, and configuring the validation assist response filter to exclude the at least one response from the pseudo set of scaled-down experimental models.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DESCRIPTION OF THE CURRENT EMBODIMENT

The present disclosure generally relates to a filter that ensures that the predictions of a PVC (post-validation calibrated) physics system simulator will remain within boundaries of a predetermined model validation domain (MVD). Specifically, embodiments of the present disclosure utilize one or more filters to ensure calibrated model parameters $\tilde{P}$ and/or calibrated responses $\tilde{\phi}$, i.e., aka posteriori values, cause physics simulator model predictions to remain within the boundaries of the model validation domain MVD for the target application. In some embodiments, predetermined filters can be utilized, while in other embodiments filters can be automatically inferred, or otherwise determined, from available measurements and other renditions of the physics system simulator during operation.

One way to ensure that the calibrated model remains within the boundaries of the MVD in accordance with the present disclosure is via a filter operator (f) configured to remove certain parameters' variations ($\Delta P$) and therefore corresponding variations in responses for experimental models ($\Delta \Phi_E$) and the target application model ($\Delta \Phi A$) that have an undesirable impact on the model validation domain (MVD). Removing certain parameters' variations implies reducing the degrees of freedom available for parameters' variations. For example, n parameters have up to n degrees of freedom to vary. Removing a degree of freedom implies the n parameters are effectively varying along an n−1 mathematical manifold. At least one variation of the parameters or responses is referred to as a feature. A feature is a mathematical function of n variables, which captures one degree of freedom from n variables, e.g., the average of two variables is denoted as a feature, the sum of squares of two variables is denoted as a feature, etc. An undesirable impact is where the model predictions are outside the MVD for the target application. Another way to ensure that the PVC physics system simulator's predictions remain within the boundaries of the MVD in accordance with the present disclosure is via a filter operator (f) configured to remove features in the scaled-down experimental responses ($\Delta\Phi_E$) that have an undesirable impact, when used by a calibration module, on the model validation domain (MVD). In some embodiments, filters can be utilized to filter certain features from parameters' variations ($\Delta P$) and certain features from responses for the scaled-down experimental models that would have an undesirable impact, when used by a calibration module, on the model validation domain (MVD), i.e., that would result in the PVC physics system simulator's predictions to be outside the MVD for the target application.

Figure 1:
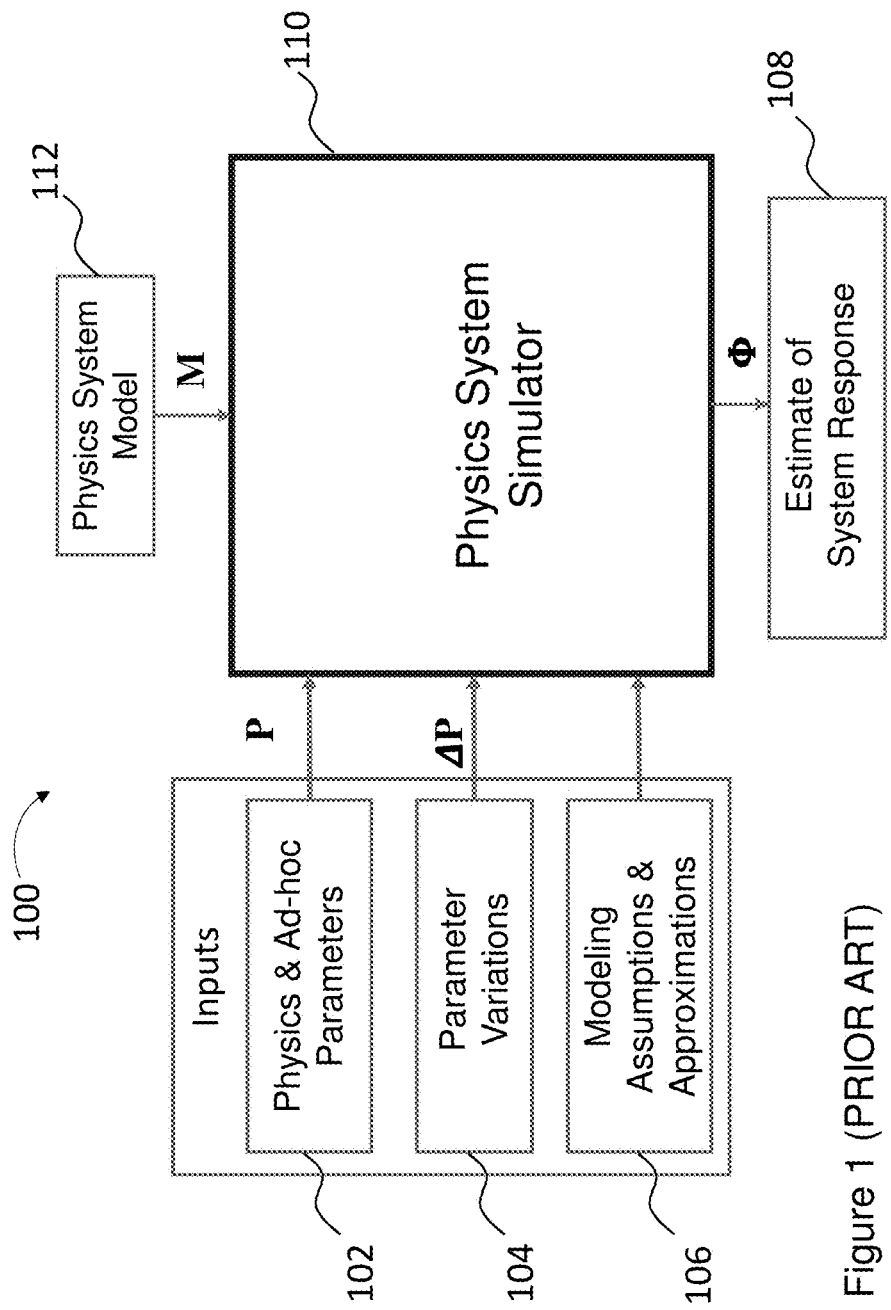
FIG. 1 illustrates a representative block diagram showing a method of operating a prior art physics system simulator to estimate, i.e., simulate, a system response.
Figure 2:
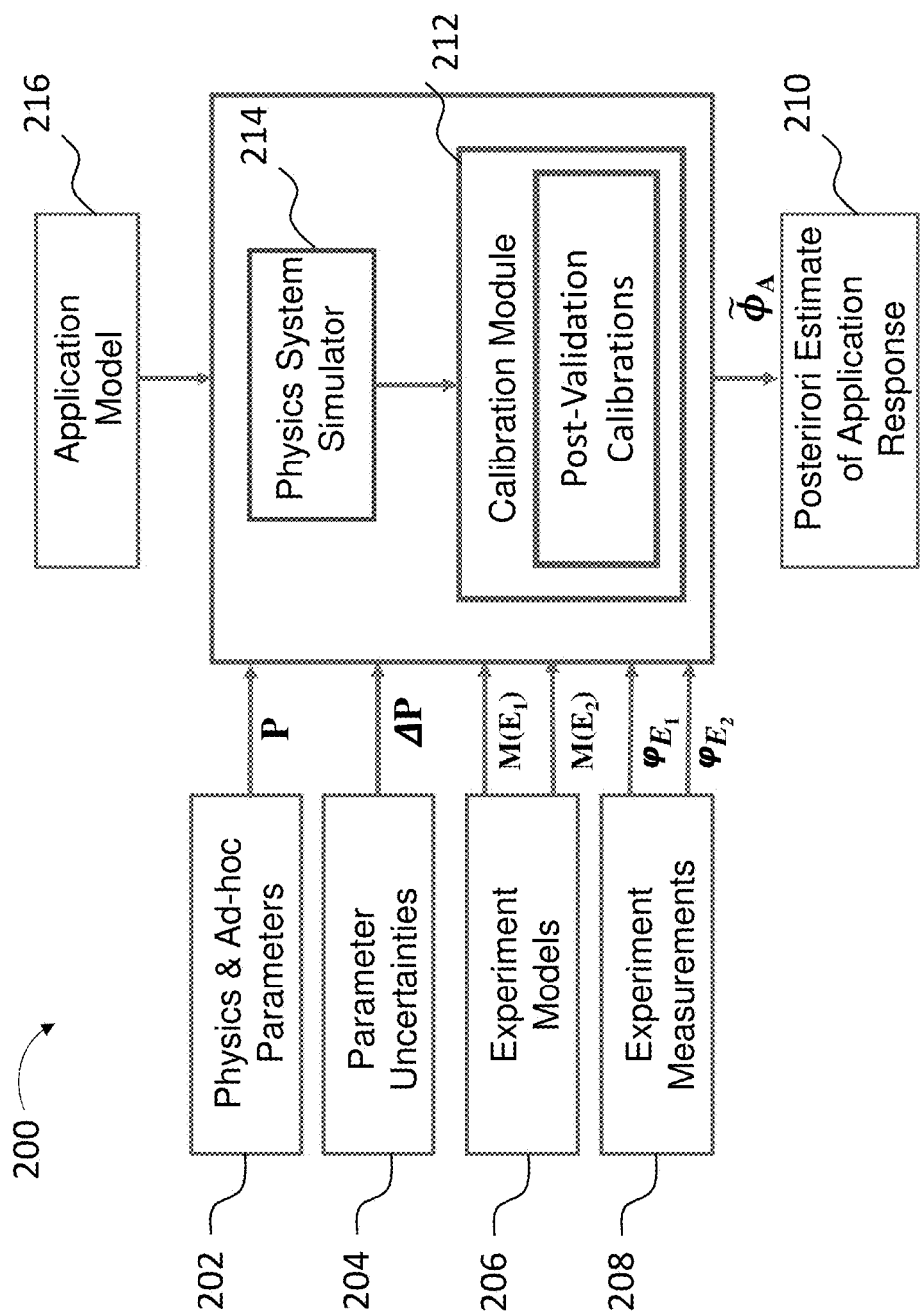
FIG. 2 illustrates a representative block diagram of a method of operating a prior art physics system simulator to estimate a system response with a calibration module.
Figure 3:
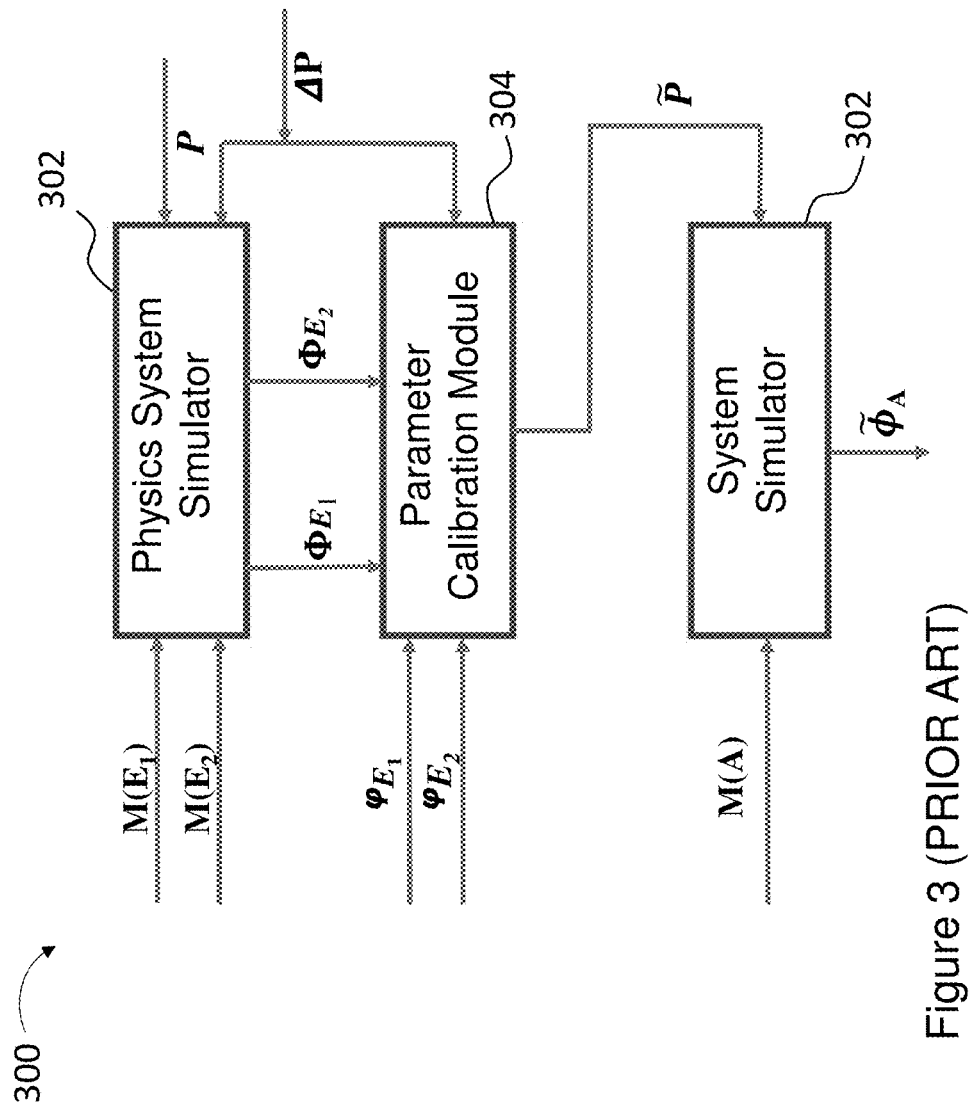
FIG. 3 illustrates a high level representative block diagram of a physics system simulator of multiple experiments, parameter adjustments, and a physics system simulator of a target application model utilizing the adjusted parameters.
Figure 4:
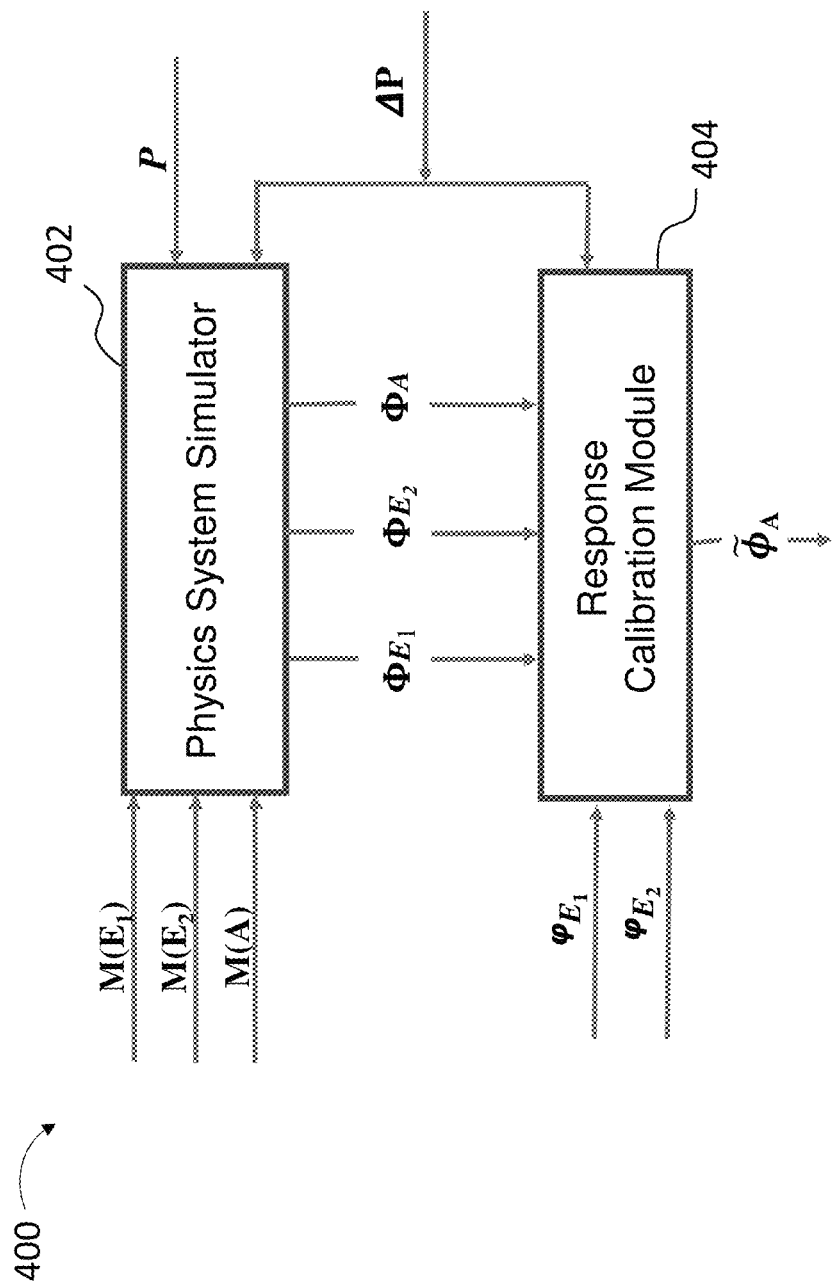
FIG. 4 illustrates another prior art representative block diagram of a physics system simulator simulating responses of multiple experiments models and a target application model along with a response calibration module.
Figure 5:
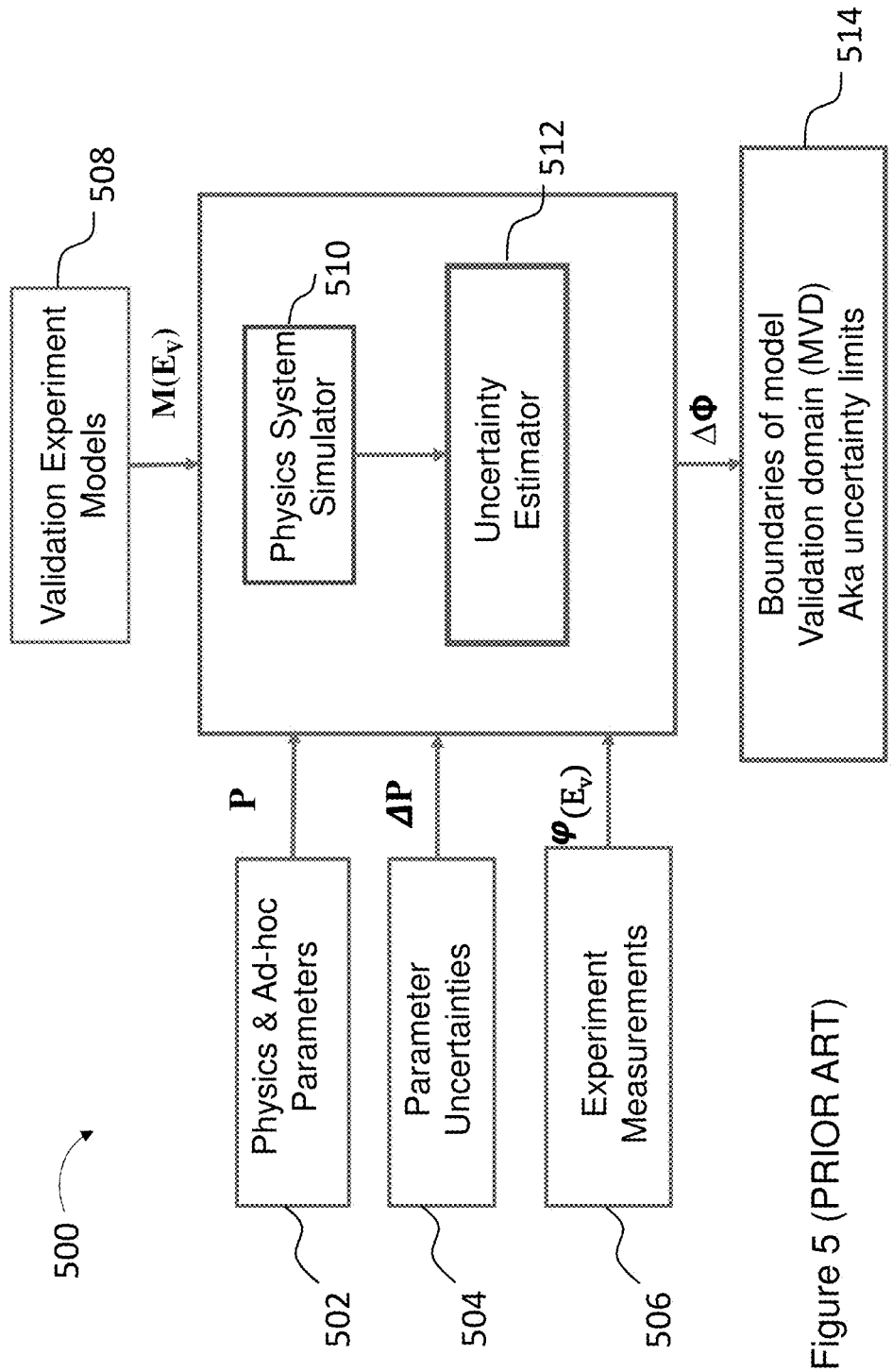
FIG. 5 illustrates a representative block diagram of a method of system model validation using multiple experiment models, experiment measurements, and an uncertainty estimator to predict boundaries of a model validation domain for a target application.
Figure 6:
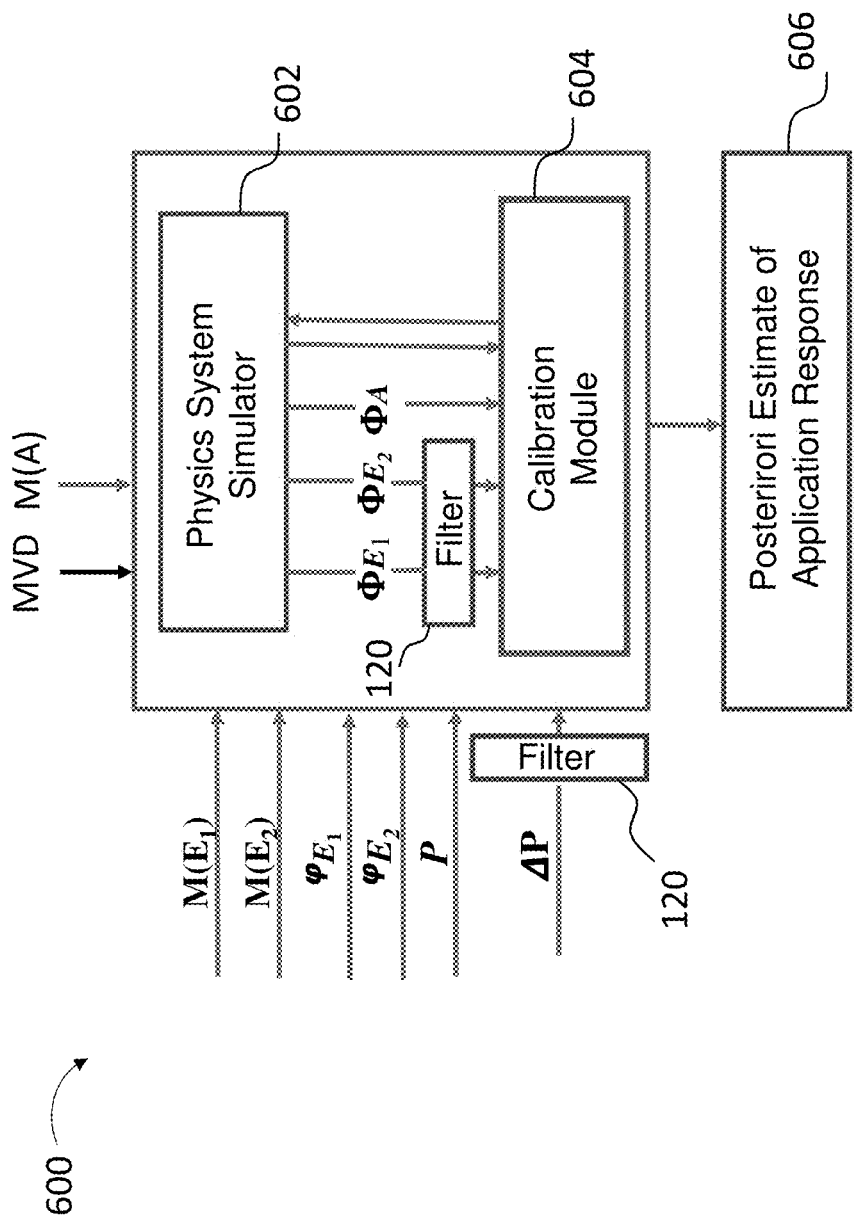
FIG. 6 illustrates a representative block diagram of a physics-guided analytical model validation in accordance with the present disclosure utilizing validation assist filtration.

Referring to FIG. 6, a representative block diagram of a physics-guided analytical model validation system 600 in accordance with one embodiment of the present disclosure is illustrated. In this embodiment, the MVD of the target application model, as well as the target application model, are provided as inputs to the physics-guided validation assist filtration system 600.

Before describing several exemplary embodiments of systems and methods in accordance with various aspects of the present disclosure, it should generally be understood that the systems and methods of the present disclosure can include and can be implemented on or in connection with one or more computers, microcontrollers, microprocessors, and/or other programmable electronics that are programmed to carry out the functions described herein. The systems may additionally or alternatively include other electronic components that are programmed to carry out the functions described herein, or that support the computers, microcontrollers, microprocessors, and/or other electronics. The other electronic components can include, but are not limited to, one or more field programmable gate arrays, systems on a chip, volatile or nonvolatile memory, discrete circuitry, integrated circuits, application specific integrated circuits ($\Delta$SICs) and/or other hardware, software, or firmware. Such components can be physically configured in any suitable manner, such as by mounting them to one or more circuit boards, or arranging them in another manner, whether combined into a single unit or distributed across multiple units. The various system models, parameters, and other data can be stored in local or remote memory. In some embodiments, the validation system can be provided on a general purpose computer, while in other embodiments the validation system can be implemented within a dedicated hardware framework.

In general, the validation assist filtration system 600 hardware includes a physics system simulator 602, a validation assist filter 120, and a calibration module 120. The validation assist filter 120 can include a validation assist parameter filter and/or a validation assist response filter, depending on the implementation. The calibration module can be based on any number of PVC-type changes such as a parameter calibration module that adjusts model parameters, a response calibration module that adjusts predicted responses, a module that changes at least one of the inherent assumptions or numerical approximations or the numerical solver of the physics system simulator, to name a few. The validation assist filter(s) filter out the parameters and/or responses that cause the PVC physics system simulator's predictions to be outside of the MVD of the original physics system simulator for which the MVD is constructed.

The validation hardware 600 accepts a number of different inputs including a target application model M(A), a model validation domain (MVD) for that target application based on the original physics system simulator, at least one experimental model ($E_\nu$), experimental measurements ($\varphi_{E_\nu}$) from the at least one experimental model, a set of one or more model parameters (P), and one or more parameter variations ($\Delta P$). Inputs are utilized by the physics system simulator to simulate the model response for each of the scaled-down experimental models and the target application model. In one aspect of the disclosure the validation assist filter 120 filters the responses from the physics system simulator 602. In another aspect of the disclosure the validation assist filter 120 filters the parameters variations $\Delta P$. In yet another aspect, both are filtered. The filtration process will be discussed in more detail below. Suffice it to say, the calibration module 604 accepts the filtered values (or combination of filtered and unfiltered values) and performs its intended function, that is to improve predictions of the PVC system physics simulator as compared to the predictions of the original physics system simulator. Due to the use of the filtered values, the predictions of the PVC system physics simulator become consistent with the MVD.

A representation of a target application model M(A) as well as a representation of its model validation domain MVD are passed to a physics simulation system 602. In addition, a set of experimental models (M($E_1$), M($E_2$), ... M($E_\nu$)), and various parameters (P) and their variations ($\Delta P$) are also passed to the simulator 602. The simulator simulates the target application model and the scaled-down experimental models to predict a target application model response $\Phi A$ and a scaled-down experimental model response $\Phi E_\nu$ for each scaled-down experimental model M($E_\nu$), which is passed to a calibration module 604.

The calibration module introduces a PVC-type change, for example, it adjusts the parameters (see FIG. 8) and/or the responses (see FIG. 10) based upon its inputs, which may include filtered parameter variations and/or filtered experimental model responses, with the filtration tailored to ensure that the calibration module output does not result in target application model responses that are outside of the MVD. That is, the filters of the present disclosure work in conjunction with the calibration module 604 are designed to ensure that the target application responses remain within the boundary of the MVD.

Figure 7:
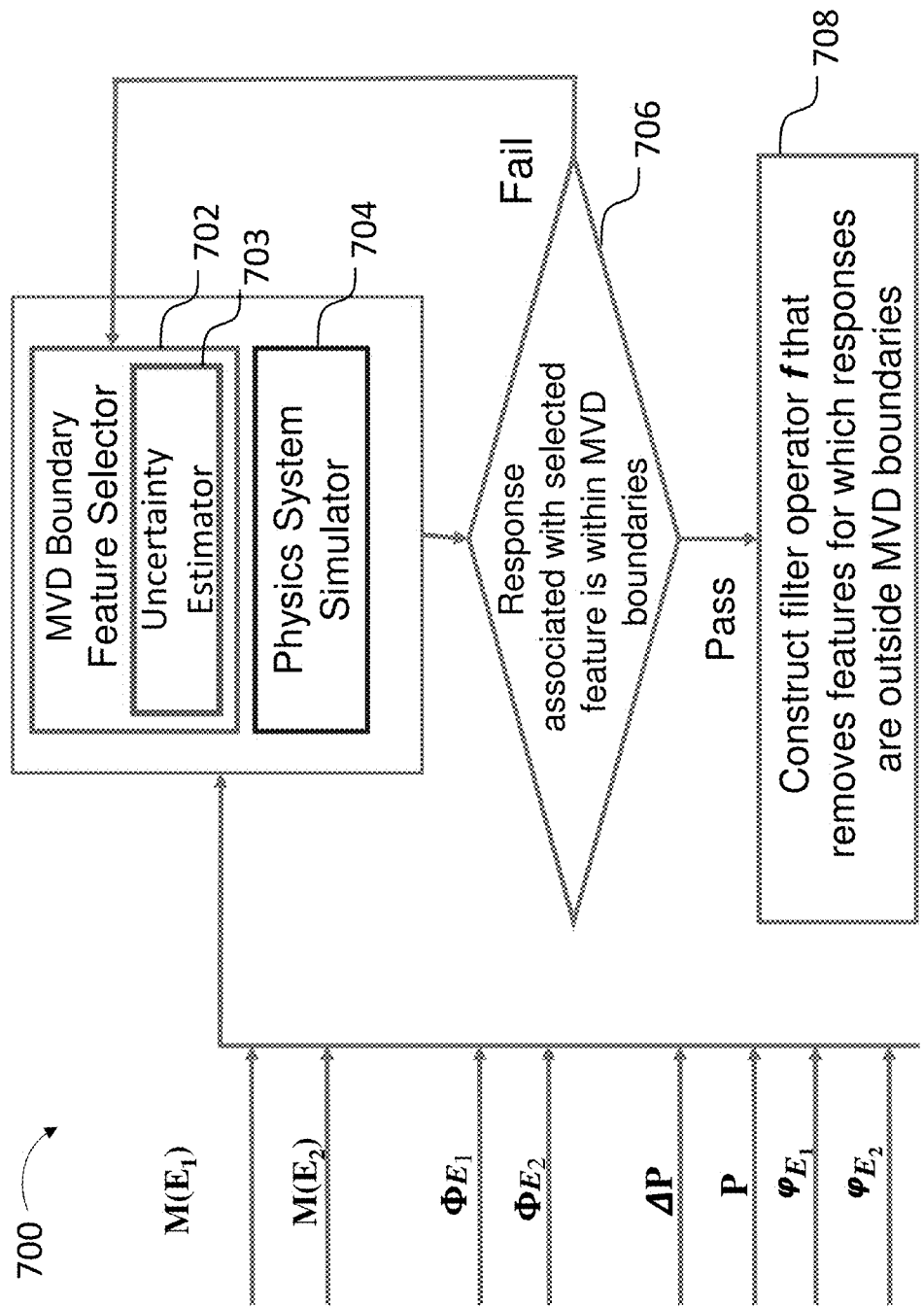
FIG. 7 illustrates a representative block diagram of a method of validation assist filtration.

Filter implementation can be pre-determined using knowledge of the model validation domain (MVD) and/or other instances of the physics system simulator, and/or inferred using available measurements, as illustrated in FIG. 7, for instance.

A validation assist filter 120 can be utilized in connection with the physics-guided analytical model validation assist filtration system as illustrated in FIG. 7. The filtration process 700 includes an MVD boundary feature selector 702 that operates in conjunction with a physics system simulator 704. In general, the process includes checking whether at least one of variations in model parameters, at least one of the variations in the responses of the target application model, at least one of the variations in the responses of the scaled-down experimental models are within the boundaries of MVD 706. The boundaries of MVD can be described mathematically using deterministic or stochastic multivariate functions, generated using an uncertainty estimator 703 as part of the MVD boundary feature selector module 702, which involves the scaled-down experimental measurements, parameters variations, assumptions and approximations inherent in the construction of the physics system simulator and system-customized expert-guided scaling recipes. If one or more of the response variations is not within the MVD boundaries, the feature or features associated with the one or more response variations are excluded from the filter operator (f) whereas for response variations that stay within the MVD boundaries, the associated feature or features are not removed by the filter operator 708.

An MVD boundary feature generally refers to any mathematical expression derived from the multi-variate functions of the variables used to describe the MVD boundary, including the parameters, at least one response from the scaled-down experiments, and at least one response from the target application. Many mathematical techniques may be used to select MVD boundary features, e.g., Singular Value Decomposition, Project Pursuit Techniques, Neural Networks, or Autoencoders, to name a few. For example, a feature may describe the component of a vector of responses projected onto a basis function. The basis function may be derived from a cloud of simulation results of the scaled-down experimental and target application models. A cloud of simulation refers to multiple executions of the physics system simulator with the parameters varied within the range of their uncertainties.

The filter operator can be constructed by (i) excluding all features that are not within the boundaries of the MVD, or (ii) including only the features that are within the boundaries of the MVD.

One embodiment of a validation assist filter for a parameter calibration-based system 800 will now be described in detail in connection with FIG. 8. This embodiment of the present disclosure utilizes a parameter validation assist filter to ensure adjusted parameters P remain within boundaries of the model validation domain MVD.

As discussed below in more detail in connection with FIG. 9, a validation assist parameter filter 820 with an MVD boundary filter operator (f) is configured to remove features in parameters variations ($\Delta P$) and features corresponding to variations in responses for experimental models ($\Delta \Phi_E$) that have an impact on the model validation domain (MVD). That is, the filter is configured to identify and filter out parameters variations, described mathematically by features, that cause PVC physics system simulator's predictions for the target application responses to fall outside of the MVD. That is, the filtration can be performed by blocking certain parameters features that cause the corresponding responses to have a value outside of a particular range from being passed through the filter operator 827 or allowing only parameters features within a particular range to be passed through the filter operator. The filtration can be a complex combination conditional filtration such that certain values of certain parameters features are filtered or unfiltered dependent upon the values of other parameters' features or groups of parameters' features because different combinations of values of different parameters' features can affect whether or not the response or the response's variations fall within the MVD. The filter implementation can be predetermined based upon knowledge of the MVD as discussed in connection with FIG. 9, for example.

Figure 8:
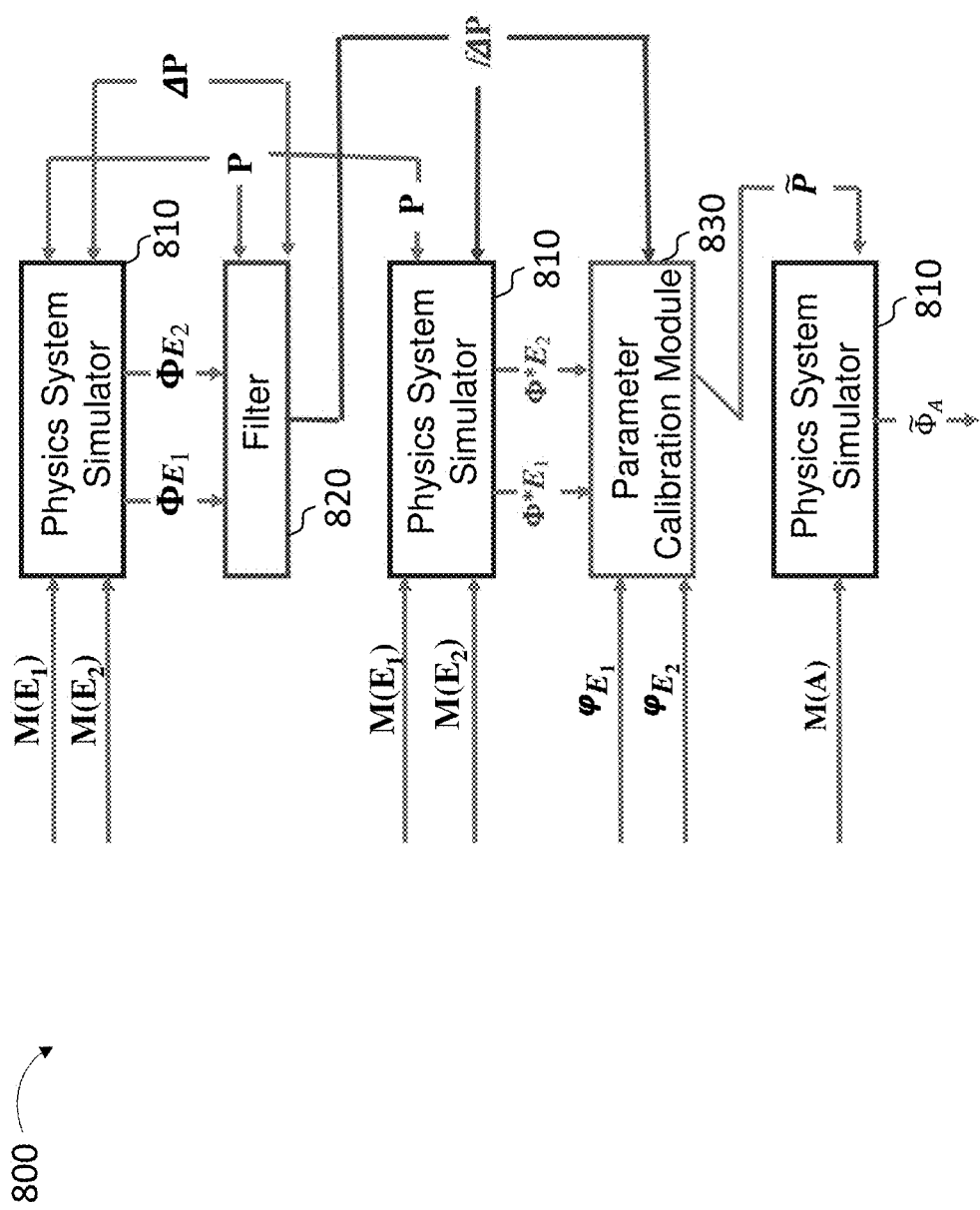
FIG. 8 illustrates a representative block diagram of a method of physics-guided analytical model validation utilizing validation assist parameter filtration.
Figure 9:
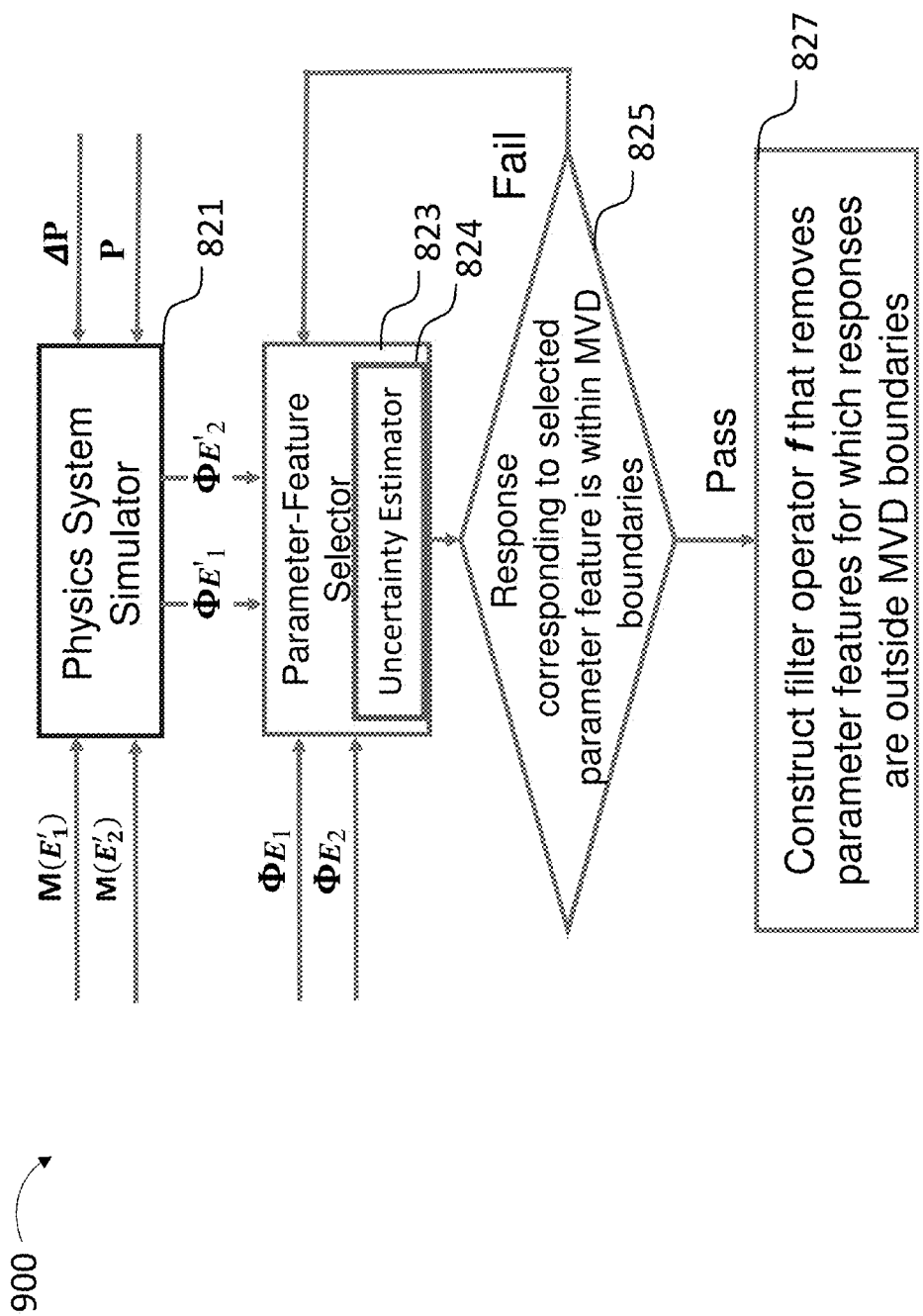
FIG. 9 illustrates a representative block diagram of validation assist parameter filtration.

FIG. 9 illustrates an exemplary filtration construction process of the validation assist filter for parameters 820 from FIG. 8. In essence, the filtration construction process 900 includes predicting with another rendition, i.e., a separate instance, of the physics system simulator (821) a set of alternatively-derived experimental responses ($\Phi_{E'_1}$, $\Phi_{E'_2}$, . . . ) of the scaled-down experimental models (M(E'$_1$), M(E'$_2$), . . . ) based on the same set of parameters (P) and their corresponding parameter variations ($\Delta P$) that are to be fed to the original physics system simulator (810). The separate instance of the physics system simulator 821 may optionally be a more accurate version of the physics system simulator 820 utilized in the validation 600 generally. If the separate instance of the physics system simulator (821) is more accurate than the original physics system simulator (810), it is typically referred to in the literature as high-fidelity or advanced simulator, implying that it produces much more accurate predictions of a system behavior. For example, it could be based on a finer mesh allowing for more detailed representation of the geometry, composition, or another aspect of the model. It could also employ more accurate mathematical equations to describe system behavior. In practice a high-fidelity or advanced simulator is not feasible to execute many times, hence it is not employed for routine engineering calculations involving the target application model.

The scaled-down experimental responses from the original physics system simulator 810 and the alternatively-derived scaled-down experimental responses from the other instance of the physics system simulator 821 are fed to a parameter-feature selector module 823, as shown in FIG. 9. The parameter-feature selector module 823 is configured to select one or more parameter features including mathematical expressions derived from the multi-variate functions of the set of responses and/or parameters used to describe the boundaries of the model validation domain (MVD), denoted earlier as MVD boundary feature.

The features causing at least one response's variations to fall within the MVD boundaries are included in the filter operator (f), while features causing at least one response's variations to fall outside the MVD boundaries are filtered out. Put another way, a validator sub-module 825 of the filter constructor 900 determines whether the scaled-down experimental responses ($\Phi_{E1}$, $\Phi_{E2}$, . . . ) and the alternatively-derived scaled-down experimental responses ($\Phi_{E'_1}$, $\Phi_{E'_2}$, . . . ) corresponding to the selected parameter features are within the MVD boundaries according to an entropy-based filtration criterion; and if not so, removing (827) the parameter features for which the experimental responses ($\Phi_{E_1}$, $\Phi_{E_2}$, . . . ) and the alternatively-derived experimental responses ($\Phi_{E'_1}$, $\Phi_{E'_2}$, . . . ) are outside the MVD boundaries.

Details related to the filter construction 900 generally and the parameter-feature selector module 823 will now be discussed in detail. The filter 820 is used to ensure that response variations calculated based on parameter variations remain within the MVD boundaries by filtering out parameter features which cause response variations to trigger a filtration criterion. Constructing one embodiment of the validation assist parameter filter 820 involves a second physics system simulator instance 821 (apart from the first instance of the physics system simulator 810). The parameter-feature selector module 823 compares the scaled-down experimental responses ($\Phi_{E_1}$, $\Phi_{E_2}$, . . . ), ($\Phi_{E'_1}$, $\Phi_{E'_2}$, . . . ) from the two separate physics system simulator instances 810, 821 and decides whether or not to filter a certain parameters' variation based upon whether at least one response to the associated parameters' feature is within MVD boundaries according to a filtration criterion. The filtration criterion can be quantified by an information-theoretic measure, which can be calculated or estimated using an off the shelf statistical module, such as those employing the KL-divergence theorem, f-divergence theorem, transfer entropy, mutual information neural estimators, to name a few. This filtration criterion is entropy-based and can be referred to as mutual information. Mutual information is an entropy-based measure which quantifies the common information content between two variables, e.g., at least one response from the target application and at least one response from the scaled-down experimental model, as simulated by the physics simulator.

In our embodiment, mutual information is used to set an upper limit on the maximum allowable increase in confidence that can be reached when introducing any PVC-type changes to a physics system simulator that has already been validated. Such entropy-based limit is not employed by the state-of-the-art methods to ensure that PVC-type changes would not violate the MVD boundaries. Put differently, the extant methods do not have a vetting process by which the PVC physics system simulator's predictions can be shown to lie within the MVD boundaries of the original physics system simulator.

The filtration criterion is such that any PVC-type change, for example a calibration or an adjustment of at least one parameter and/or at least one response, would not lead to an increase in the mutual information between at least one response from the target application and at least one response from the scaled-down experiments. Techniques used by the state-of-the-art calibration modules, e.g., Bayesian estimation, Generalized Least-Squares Methodology, Maximum Likelihood Estimation, to name a few, do not enforce this requirement and hence run the risk of violating the boundaries of the MVD, which can be discovered only after the target application is rendered in real life in the form of a real physical system from which real measurements can be collected. An increase in the mutual information, caused for example by an adjustment/calibration of the physics system simulator's parameters and/or responses, implies that the physics system simulator predictions for the scaled-down experiments become more informative on the target application response. Such increase in mutual information is not warranted by the MVD construction and hence should not be allowed, i.e., it is to be filtered out by the filter 820.

For the parameter-filter selector module 823, the feature selection can be conducted using any number of off the shelf techniques such as singular value decomposition, project pursuit techniques, autoencoder-based machine learning methods, or any custom expert-guided feature engineering techniques. A selected feature is removed if it triggers a filtration criterion 825 based on an entropy-based mutual information measure. The mutual information can be calculated using any standard statistical module, such as those employing KL-divergence theorem, f-divergence theorem, Fischer information, machine-learning and autoencoder-based tools, etc., between the simulated samples of at least on target application response and the simulated samples of at least one of scaled-down experimental responses. If a statistical-based method is employed to calculate the mutual information, a threshold-based criterion may be employed to determine when the mutual information has increased. This is because statistical-based methods incur some variability when the mutual information is recalculated using different sets of samples. A minimum threshold may be set by the user, above which the mutual information is considered to have experienced an increase large enough to trigger the filtration criterion.

The feature selection techniques in the parameter-feature selector module 823 can be configured to operate based on a comparison of responses from multiple physics system simulators (810 and 821), which can be especially useful where experimental measurements are not available for experimental models $M(E_1)$, $M(E_2)$ that correspond to the target application model. Put another way, the parameter-feature selector module 823 can be used when the analyst has access to a multi-fidelity physics system simulation environment. For example, one implementation 810 of the physics system simulator can correspond to a low-fidelity implementation used for routine calculations for which the MVD is constructed, and 821 is a high-fidelity implementation used to support the design and optimization of the target application model. In an alternative embodiment, both 810 and 821 can correspond to low-fidelity implementations developed by two independent entities, e.g., a regulator and a licensee trying to obtain license from the regulator, where the first implementation is employed by one entity, e.g., the regulator, to verify that the calibrated parameters are consistent with the MVD of the second implementation, e.g., by the licensee. In alternative embodiments both may be high-fidelity, where one is interested in assessing the value of new improvements to a physics system simulator.

Figure 10:
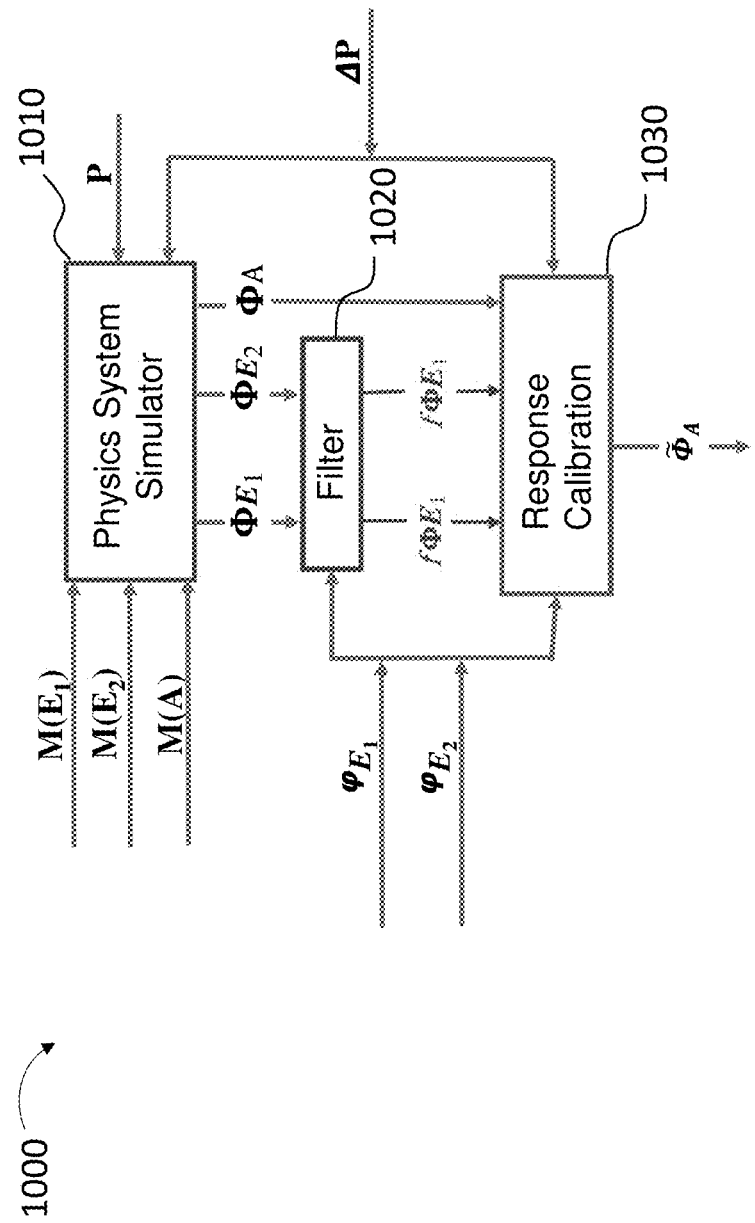
FIG. 10 illustrates a representative block diagram of a physics-guided analytical model validation utilizing validation assist response filtration.

Referring to FIG. 10 an exemplary embodiment of a validation assist response filter for a validation system 1000 is illustrated. In this embodiment, the validation assist response filter 1020 ensures adjusted, i.e., calibrated, responses $\tilde{\phi}$ remain within boundaries of the model validation domain MVD. This is achieved via a filter operator (f) configured to remove variations in simulated responses for scaled-down experimental models ($\Phi_{E1}, \Phi_{E2}, \ldots$) that have an impact on the MVD, as defined earlier by an entropy-based filtration criterion.

Specific filter implementations can be inferred using available measurements ($\varphi E_1, \Phi E_2, \ldots$), as show in FIG. 10, for instance. This type of filter 1020 can be configured to be used when a single physics system simulator is available for which the MVD is constructed. Where the filtration has access to experimental measurements ($\Phi E_1, \varphi E_2, \ldots$) and simulated scaled-down experimental responses ($\Phi_{E1}, \Phi_{E2}, \ldots$), the MVD boundaries can be used to select features by a response feature selector 1023 which are checked against a filtration criterion 1025 to determine whether they should be removed or retained in the construction of the filter operator 1027. The resulting filter 1020 produces filtered scaled-down experimental responses (f$\Phi E_1$, f$\Phi E_2$) which ensure that a subsequent calibration module 1030 does not lead to response variations that do not violate the MVD boundaries.

The response feature selector 1023 can be configured to operate based on an execution of multiple pseudo runs as follows. In each pseudo run, the response feature selector 1023 selects one of the scaled-down experimental models as a pseudo target application model. This selection can be done at random or in an ordered one-at-a-time fashion. To begin, select a subset of the scaled-down experiments to represent a pseudo set of scaled-down experiments. The pseudo set of scaled-down experimental models is to exclude the pseudo target application model. The filtration criterion 1025 calculates an increase in the mutual information between at least one response from the pseudo target application, as simulated by the physics system simulator, and at least one response from the pseudo scaled-down experiments, as simulated by the same physics system simulator, with the physics system simulator employing the adjusted, i.e., calibrated, parameters and/or responses. The response feature selector 1023 repeats this process by selecting another pseudo target application model and another set of pseudo scaled-down experiments. In each pseudo run, the features that increase the mutual information beyond a pre-determined threshold are configured to be filtered out 1025. When no more features are filtered out by executing a single or few additional pseudo runs by the feature selector 1023, the process may be terminated. The filter operator 1027 can be constructed by excluding all the features that increase the mutual information beyond the threshold from all the pseudo runs.

A number of exemplary use cases of systems and methods of physics-guided analytical model validation in accordance with the present disclosure will now be discussed in detail.

A number of use cases involve the validation of computer models used in support of the design of nuclear systems. Validation of models for these types of systems can be especially relevant because it can be incredibly expensive to build a physical system based upon a computer model without assurances that the fully built system will act as predicted by the target application model.

A number of the models relate to activities supporting operation and safety of the nuclear systems. Some models relate to nuclear power plants, for example some relate to: analyses for supporting small-scale mock-up experiments; analyses for supporting separate-effects experiments; analyses for supporting integral-effects experiments; validation of computer models for first-of-a-kind reactor designs; and validation of computer models for advanced fuel designs. Other models relate to fuel testing facilities, for example some relate to transportation of irradiated nuclear fuel; burnup credit evaluation; destructive and nondestructive assessment of irradiated nuclear fuel inventory; anomaly detection for condition monitoring during nuclear facility operation; and validation of codes used to model aging nuclear weapons systems.

Looking more closely at first-of-a-kind reactor design, model validation can be especially important because by its nature no experimental measurements exist. Multi-fidelity computer codes exist, including low- and high-fidelity physics models of the design of the first of a kind reactor. The high-fidelity physics models can be used to generate virtual experimental measurements, e.g., representing the measurements collected from the scaled-down experimental models $M(E_1)$, $M(E_2)$ and a low-fidelity physics model can be used to represent the target application model $M(A)$. This allows the methodology of FIGS. 8-9 to be utilized to compare multiple different physics model simulation responses. It can also be employed to test the value of new improvements to a physics system simulator. This can be done by assessing the value of a new improvement in reshaping the MVD boundaries.

Online monitoring of a nuclear power plant or process can include modeling various nuclear processes such as: (i) material accountability and traceability in fuel reprocessing plants; (ii) fuel enrichment plants; (iii) fuel manufacturing plants; and (iv) monitoring of nuclear power plant operation.

Figure 11:
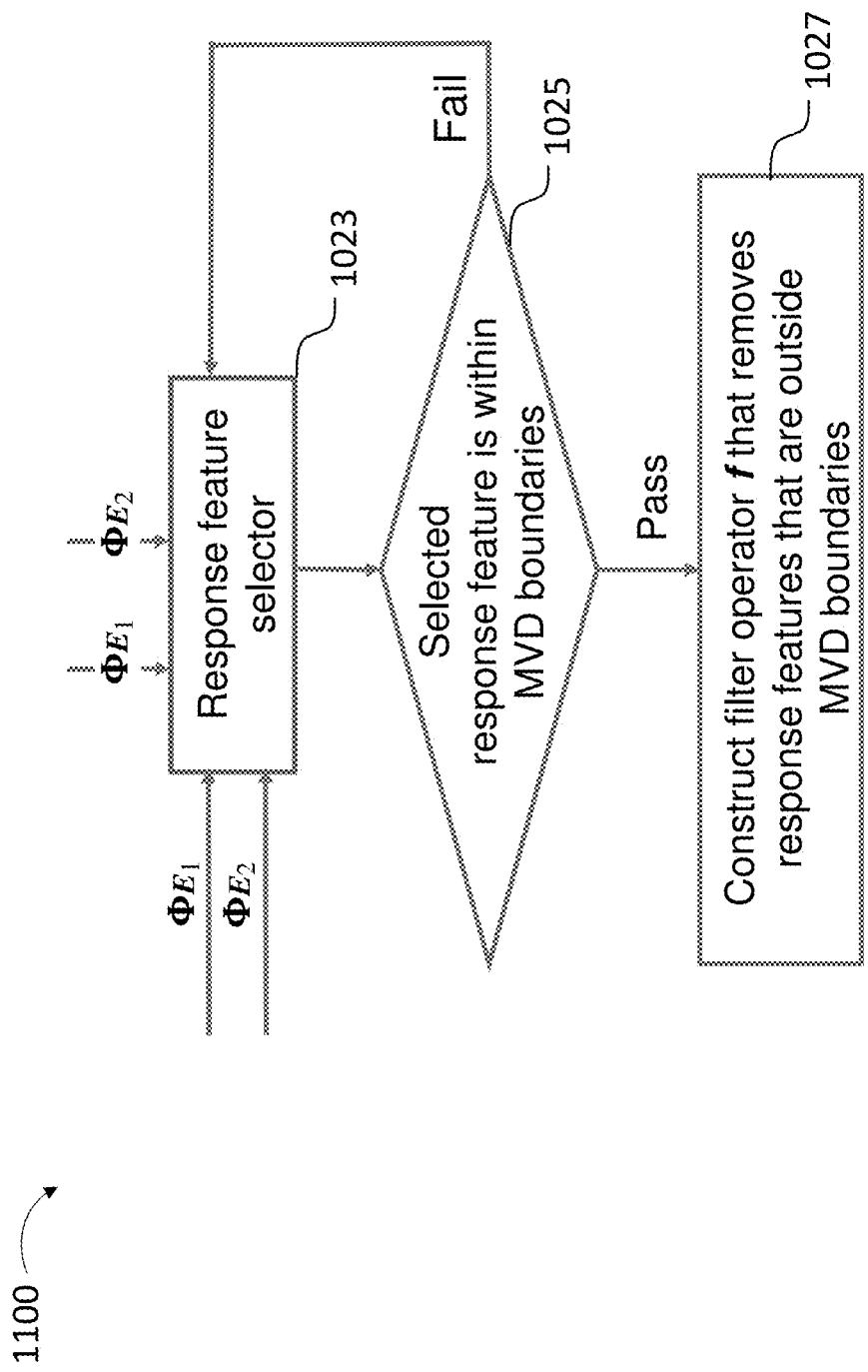
FIG. 11 illustrates a representative block diagram of validation assist response filtration.

Sensor measurements are continuously collected for forecasting and to identify anomalous behavior. For forecasting purposes: (i) the collected sensor's measurements represent the responses collected from the scaled-down experimental models ($M(E_1)$, $M(E_2)$, . . . ) and (ii) the future predictions represent the responses of a target application model $M(A)$. Anomaly detection algorithms can be employed to flag certain measurements as anomalous. These algorithms can be validated using the disclosed methodologies (e.g., the filtration described in connection with FIGS. 10-11 where experimental measurements are available) by splitting historical data into two groups: (i) one representing the experimental conditions, corresponding to the scaled-down experimental models $M(E_1)$, $M(E_2)$, . . . and (ii) the other representing the target application model $M(\Delta)$.

Another use case is for validating modeling of nuclear material transportation applications. A target application model $M(A)$ can represent the condition of the nuclear materials after discharge from the nuclear reactor. Scaled-down experimental model(s) $M(E_1)$, $M(E_2)$ can describe the irradiation conditions inside the nuclear reactor.

Another use case relates to advanced fuel designs. New fuels to be introduced in an existing nuclear reactor can be modeled and validated using the filtration validation methodologies described herein. Scaled-down experimental models $M(E_1)$, $M(E_2)$, . . . can represent the conditions of current fuel designs after irradiation during residence time in the reactor. A target application model $M(A)$ represents the modeled behavior of the advanced fuel design.

Another use case relates to the physics system simulators used to simulate the detonation of high explosives, especially the aging stock of nuclear weapons, and how a particular weapon would perform if a detonation is initiated. Given the complexity of the physics models, researchers are forced to detonate samples of the explosives in small amounts and different geometries, and observe the explosions with specialized tools and compare the results to the simulation. These scaled-down experiments are used to refine the model via a calibration module by adjusting some of the model parameters. The state-of-the-art calibration techniques employed are empirical and cannot be proven to be consistent with the MVD established for the original weapon upon its construction.

The filtration validation methodologies of the present disclosure can be used to (i) validate the predictions of the physics system simulator, and (ii) support its continual update based on collected operational data. For validation, historical data may be split into two batches, one representing the scaled-down experimental models $M(E_1)$, $M(E_2)$, . . . and the other the target application model $M(A)$. For continuous update, scaled-down experimental models $M(E_1)$, $M(E_2)$, . . . represent historical data, and the target application model $M(A)$ represents future conditions.

Another aspect of the present disclosure relates to establishing prediction confidence. Confidence can be established in the prediction of a reduced order model, trained against predictions of a higher fidelity model. In many situations, it is not feasible to work with a high-fidelity physics system simulator due to its complexity and taxing computational requirements. In order to address this, the present disclosure executes the high-fidelity physics system simulator many times to train the reduced order model using existing machine learning methods.

The available training data are then split into two batches, one to represent scaled-down experimental models, e.g., as $M(E_1)$, $M(E_2)$, . . . and one target application model, e.g., $M(\Delta)$. The reduced order model is used to model both the experimental and application models, and the higher fidelity physics system simulator predictions are taken to represent the experimental model from the first batch, which are employed to make predictions about the application model of the second batch, thus providing a basis to validate the predictions of reduced order models.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A method for post-validation adjustment of a physics system simulator configured to simulate predicted behavior and/or state of a physical system based on an application model ($M_A$) and multiple physical or adhoc parameters (P), denoted as model parameters, and their corresponding known parameter variations ($\Delta P$), wherein the application model ($M_A$) is related to one or more scaled-down experimental models ($M_{E_1}, M_{E_2}, \ldots$), each scaled-down experimental model ($M_{E_j}$) being associated with a respective set of experimental measurements ($\varphi_{E_j}$), where j=1, 2, . . . , wherein the physics system simulator is validated for a target application model ($M_A$), as described by a model validation domain (MVD) the boundaries of which are evaluated mathematically based on deterministic or stochastic multi-variate functions of the target application model's responses, a set of scaled-down experimental-models' responses, the corresponding sets of experimental measurements ($\varphi_{E_1}, \varphi_{E_2}, \ldots$), derivatives thereof, and the model parameters (P), the corresponding parameter variations ($\Delta P$), and an uncertainty estimator, the method comprising:

predicting, by a first implementation (810) of the physics system simulator, first experimental responses ($\Phi_{E_1}, \Phi_{E_2} \ldots$) of the physical system by modeling the physical system using the scaled-down experimental models ($M_{E_1}, M_{E_2}, \ldots$) based on the model parameters (P) and their corresponding parameter variations ($\Delta P$);

filtering, by a validation assist parameter filter (820) having an MVD boundary filter operator, the parameter variations ($\Delta P$) corresponding to variations in responses for experimental models ($\Delta \Phi_E$) that cause the predictions of a second physics system simulator, denoted by post-validation calibrated (PVC) physics system simulator, for the target application responses to fall outside of the MVD of the first physics system simulator;

updating, by the first implementation (810) of the physics system simulator, the first scaled-down experimental responses ($\Phi_{E_1}, \Phi_{E_2}, \ldots$) of the physical system by modeling the physical system using the scaled-down experimental models ($M_{E_1}, M_{E_2}, \ldots$) based on the physical parameters (P) and their corresponding filtered parameter variations (f$\Delta P$);

adjusting, with a parameter calibration module (830), the physical parameters (P) based on the updated first scaled-down experimental responses ($\Phi_{E_1}^*, \Phi_{E_2}^*, \ldots$), the corresponding sets of experimental measurements (($\varphi_{E_1}, \varphi_{E_2}, \ldots$), and the filtered parameter variations (f$\Delta P$); and predicting, by the first implementation (810) of the physics system simulator, a posteriori application response ($\tilde{\Phi}_A$) of the physical system by modeling the physical system using the application model ($M_A$) based on the adjusted physical parameters ($\tilde{P}$).

2. The method of claim 1, wherein the filtering comprises
predicting, by a second implementation (821) of the physics system simulator different from the first implementation (810) of the physics system simulator, second scaled-down experimental responses ($\Phi_{E'_1}^*, \Phi_{E'_2}^*, \ldots$) of the physical system by modeling the physical system using the same or second scaled-down experimental models (M ($E'_1$), M($E'_2$), . . . ) based on the same model parameters (P) and their corresponding parameter variations ($\Delta P$);

selecting, by a parameter-feature selector (823), parameter features comprising mathematical expressions derived from the multi-variate functions used to describe the boundaries of the model validation domain (MVD);

determining, by a validator (825) of the filter module, whether the first scaled-down experimental responses ($\Phi_{E_1}, \Phi_{E_2}, \ldots$) and the second scale-down experimental responses, ($\Phi_{E'_1}^*, \Phi_{E'_2}^*, \ldots$), corresponding to the selected parameter features are within the boundaries of the model validation domain (MVD); and in response to the parameter features falling outside the boundaries of the MVD, removing, by a remover (827), the parameter features for which the first scaled-down experimental responses ($\Phi_{E_1}, \Phi_{E_2}, \ldots$) and the second scaled-down experimental responses ($\Phi_{E'_1}^*, \Phi_{E'_2}^*, \ldots$) are outside the boundaries of the model validation domain (MVD).

3. The method of claim 2, wherein
the first implementation (810) of the physics system simulator is a high-fidelity implementation of the physics system simulator, and
the second implementation (821) of the physics system simulator is a low-fidelity implementation of the physics system simulator.

4. The method of claim 2, wherein selecting the parameter features is performed using one or more of singular value decomposition, project pursuit techniques, or neural networks.

5. The method of claim 1, wherein the filtering is based upon an increase in mutual information beyond a threshold determined by comparison of scaled-down experimental responses ($\Phi_{E1}, \Phi_{E2}, \ldots$), ($\Phi_{E_1}, \Phi_{E_2}, \ldots$) from two separate physics system simulator instances.

6. A system comprising:
one or more hardware processors;
memory encoding instructions that, when performed by the hardware processors, cause the system to perform the method for post-validation adjustment of a physics system simulator configured to simulate predicted behavior and/or state of a physical system of claim 1; and
wherein the method for post-validation adjustment of a physics system simulator configured to simulate predicted behavior and/or state of a physical system supports separate-effect experiments for nuclear-power plants.

7. A system comprising:
one or more hardware processors;
memory encoding instructions that, when performed by the hardware processors, cause the system to perform the method for post-validation adjustment of a physics system simulator configured to simulate predicted behavior and/or state of a physical system of claim 1; and wherein the method for post-validation adjustment of a physics system simulator configured to simulate predicted behavior and/or state of a physical system supports integral-effect experiments for nuclear-power plants.

8. A system comprising:

one or more hardware processors;

memory encoding instructions that, when performed by the hardware processors, cause the system to perform the method for post-validation adjustment of a physics system simulator configured to simulate predicted behavior and/or state of a physical system of claim 1; and wherein the method for post-validation adjustment of a physics system simulator configured to simulate predicted behavior and/or state of a physical system supports small-scale mock-up experiments for nuclear-power plants.

9. A system comprising:

one or more hardware processors;

memory encoding instructions that, when performed by the hardware processors, cause the system to perform the method for post-validation adjustment of a physics system simulator configured to simulate predicted behavior and/or state of a physical system of claim 1; and wherein the method for post-validation adjustment of a physics system simulator configured to simulate predicted behavior and/or state of a physical system validates first-of-a-kind reactor designs for nuclear-power plants.

10. A system comprising:

one or more hardware processors;

memory encoding instructions that, when performed by the hardware processors, cause the system to perform the method for post-validation adjustment of a physics system simulator configured to simulate predicted behavior and/or state of a physical system of claim 1; and wherein the method for post-validation adjustment of a physics system simulator configured to simulate predicted behavior and/or state of a physical system validates advanced-fuel designs for nuclear power-plants.

11. A system comprising:

one or more hardware processors;

memory encoding instructions that, when performed by the hardware processors, cause the system to perform the method for post-validation adjustment of a physics system simulator configured to simulate predicted behavior and/or state of a physical system of claim 1; and wherein the method for post-validation adjustment of a physics system simulator configured to simulate predicted behavior and/or state of a physical system supports transportation of irradiated nuclear fuel for fuel-testing facilities.

12. A system comprising:

one or more hardware processors;

memory encoding instructions that, when performed by the hardware processors, cause the system to perform the method for post-validation adjustment of a physics system simulator configured to simulate predicted behavior and/or state of a physical system of claim 1; and wherein the method for post-validation adjustment of a physics system simulator configured to simulate predicted behavior and/or state of a physical system evaluates burn-up credit for fuel-testing facilities.

13. A system comprising:

one or more hardware processors;

memory encoding instructions that, when performed by the hardware processors, cause the system to perform the method for post-validation adjustment of a physics system simulator configured to simulate predicted behavior and/or state of a physical system of claim 1; and wherein the method for post-validation adjustment of a physics system simulator configured to simulate predicted behavior and/or state of a physical system destructively or non-destructively assesses irradiated nuclear fuel inventory for fuel-testing facilities.

14. A system comprising:

one or more hardware processors;

memory encoding instructions that, when performed by the hardware processors, cause the system to perform the method for post-validation adjustment of a physics system simulator configured to simulate predicted behavior and/or state of a physical system of claim 1; and wherein the method for post-validation adjustment of a physics system simulator configured to simulate predicted behavior and/or state of a physical system detects anomalies as part of condition monitoring of fuel-testing facilities.

* * * * *